United States Patent
Stanek et al.

(10) Patent No.: US 9,014,952 B2
(45) Date of Patent: Apr. 21, 2015

(54) METHOD AND SYSTEM FOR IMPROVING STOPPING AND STARTING OF A TURBOCHARGED ENGINE

(75) Inventors: Joe F. Stanek, Northville, MI (US); John A. Lockwood, Canton, MI (US); Sam Hashemi, Farmington Hills, MI (US); Donald Charles Franks, Linden, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 13/598,473

(22) Filed: Aug. 29, 2012

(65) Prior Publication Data

US 2014/0067238 A1    Mar. 6, 2014

(51) Int. Cl.
F02B 33/00 (2006.01)
F02D 23/00 (2006.01)
F02D 41/04 (2006.01)
F02D 41/06 (2006.01)
F02D 41/00 (2006.01)
F02D 17/04 (2006.01)
F02N 11/08 (2006.01)
F02B 23/10 (2006.01)
F02D 13/02 (2006.01)

(52) U.S. Cl.
CPC .............. F02D 23/00 (2013.01); F02D 41/042 (2013.01); F02D 41/065 (2013.01); F02N 11/0814 (2013.01); F02D 41/0007 (2013.01); F02B 23/104 (2013.01); F02D 13/0265 (2013.01); F02D 17/04 (2013.01); Y02T 10/144 (2013.01)

(58) Field of Classification Search
CPC ................................. F02B 37/22; F02B 37/24
USPC ........ 123/559.1, 559.565; 701/103, 112, 113; 60/608
See application file for complete search history.

(56) References Cited

U.S. PATENT DOCUMENTS

| | | |
|---|---|---|
| 4,884,407 A | 12/1989 | Hatanaka |
| 4,897,998 A | 2/1990 | Sekiyama et al. |
| 5,133,188 A | 7/1992 | Okada |
| 5,142,868 A | 9/1992 | Woon et al. |
| 6,539,716 B2 | 4/2003 | Finger et al. |
| 6,637,204 B2 | 10/2003 | Ellmer et al. |
| 7,051,527 B2 * | 5/2006 | Schmid et al. ................... 60/602 |
| 7,637,106 B2 * | 12/2009 | Hertweck et al. ................ 60/602 |
| 7,801,665 B2 * | 9/2010 | Buckland et al. ............. 701/103 |

(Continued)

FOREIGN PATENT DOCUMENTS

| | | |
|---|---|---|
| EP | 1004760 A2 | 11/1999 |
| JP | 2006194170 A | 7/2006 |

OTHER PUBLICATIONS

Ruona, William Charles et al., "Method and System for Operating an Engine Turbocharger," U.S. Appl. No. 13/598,396, filed Aug. 29, 2012, 32 pages.

(Continued)

Primary Examiner — Hai Huynh
(74) Attorney, Agent, or Firm — David Kelley; Alleman Hall McCoy Russell & Tuttle LLP (57) ABSTRACT

A system and method for improving engine starting and stopping is described. In one example, turbine vanes are adjusted to increase engine exhaust backpressure to reduce engine stopping time and to limit engine speed overshoot during engine starting. The system and method may reduce engine emissions and improve a vehicle driving experience.

20 Claims, 8 Drawing Sheets

(56) References Cited

U.S. PATENT DOCUMENTS

| | | | |
|---|---|---|---|
| 8,316,642 B2 * | 11/2012 | McEwan et al. ............... 60/612 |
| 8,347,613 B2 | 1/2013 | Van Nieuwstadt | |
| 2002/0078934 A1 | 6/2002 | Hohkita et al. | |
| 2007/0234982 A1 | 10/2007 | Kolmanovsky et al. | |
| 2007/0234985 A1 | 10/2007 | Kolmanovsky | |
| 2008/0190107 A1 | 8/2008 | Ogiso | |
| 2009/0292446 A1 | 11/2009 | Tanaka | |
| 2010/0011764 A1 | 1/2010 | Andrews | |
| 2011/0107739 A1 | 5/2011 | Shimizu et al. | |

OTHER PUBLICATIONS

Byrd, Kevin Durand et al., "Method and System for Improving Stopping and Starting of a Turbocharged Engine," U.S. Appl. No. 13/598,427, filed Aug. 29, 2012, 29 pages.

* cited by examiner

METHOD AND SYSTEM FOR IMPROVING STOPPING AND STARTING OF A TURBOCHARGED ENGINE

BACKGROUND/SUMMARY

Engines may be automatically stopped and started to conserve fuel. However, each time the engine is automatically stopped and started, the possibility of increased engine emissions and driver dissatisfaction may increase. For example, if an engine rotates longer than is desired during engine stopping, the engine may pump air to the exhaust system such that operation of exhaust after treatment components may degrade. On the other hand, engine speed may increase during engine restarting such that more than a desired amount of engine torque is transferred to a vehicle's wheels during engine starting. Consequently, automatic engine stopping and starting may improve fuel economy at the expensed of engine emissions and driver satisfaction.

The inventors herein have recognized the above-mentioned limitations and have developed an engine system, comprising: an engine; a turbocharger coupled to the engine, the turbocharger including adjustable turbine vanes; and a controller including non-transient instructions to adjust a turbine vane position in response to a request to stop the engine, the position adjusted to increase engine exhaust backpressure.

By adjusting turbine vane position during engine stopping, it may be possible to reduce an amount of time for an engine to stop. Consequently, an amount of air pumped through the engine during engine stopping may be reduced. Further, the turbine vanes may be adjusted during engine starting to reduce engine speed overshoot. As a result, a desired amount of torque may be transferred from the engine to a vehicle's wheels during automatic engine starting.

The present description may provide several advantages. For example, the approach may reduce engine emissions during engine stopping. Additionally, the approach may improve engine starting. Further still, the approach may provide an improved driving experience for an automatically stopped and started vehicle.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to stopping and starting a turbocharged engine. In one example, the turbocharged engine may be stopped in a way that may reduce an amount of oxygen delivered to an exhaust after treatment device. In another example, the turbocharged engine is started in a way that may improve a driver's driving experience. Example systems may include the features shown in FIGS. 1-3 according to the block diagrams of FIGS. 6 and 7. The engine and turbocharger may be operated to provide the sequences of FIGS. 4 and 5 via the method shown in FIGS. 8 and 9. In one example, the method includes adjusting turbine vanes to increases engine exhaust system backpressure during engine stopping and starting.

Figure 1:
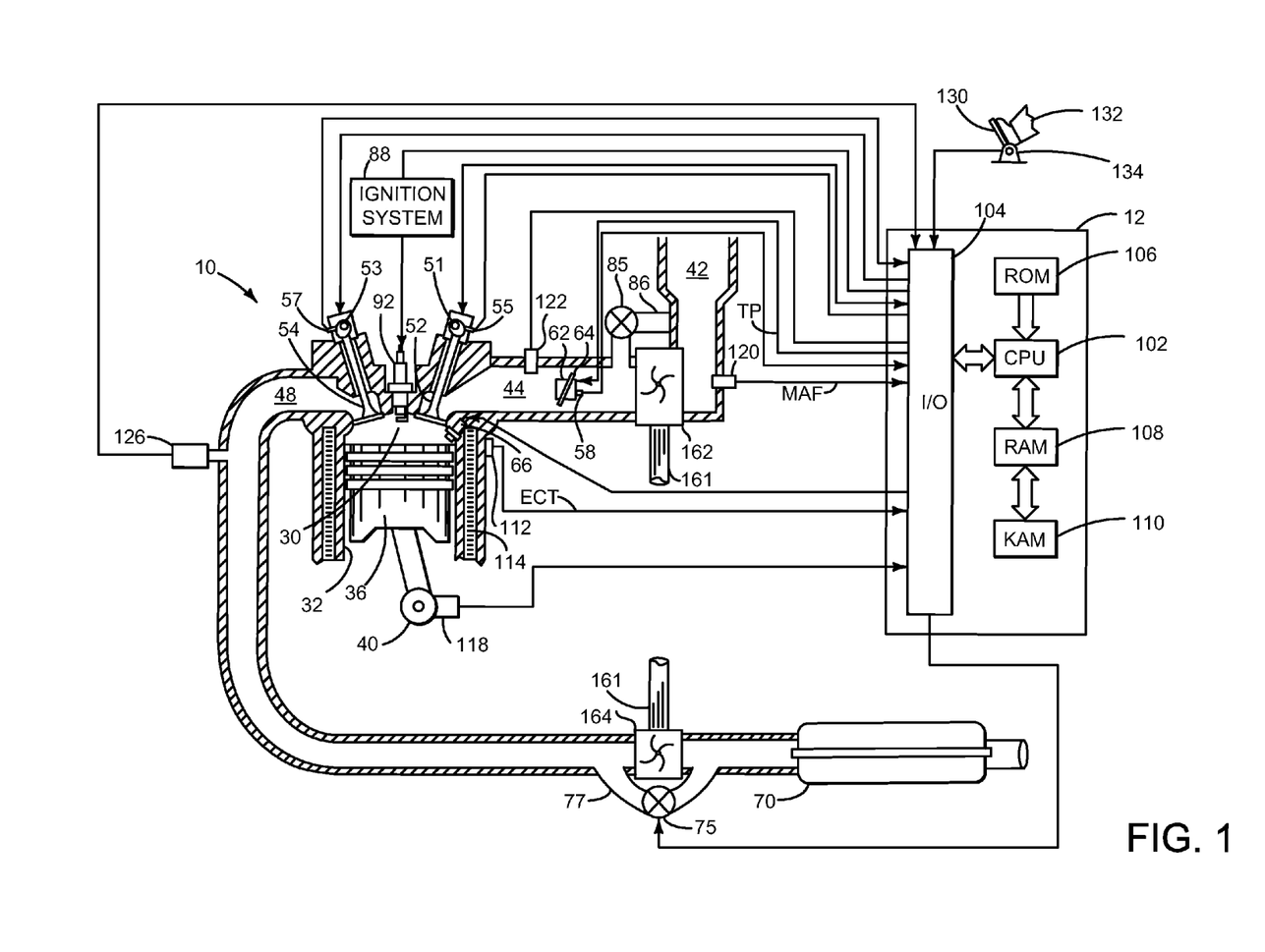
FIG. 1 shows a schematic depiction of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage 77 is included so that exhaust gases may bypass turbine 164 during selected operating conditions. Flow through bypass passage 77 is regulated via waste gate 75. Further, a compressor bypass passage 86 may be provided in some examples to limit pressure provided by compressor 162. Flow though bypass passage 86 is regulated via valve 85. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 for igniting an air-fuel mixture via spark plug 92 in response to controller 12. In other examples, the engine may be a compression ignition engine without an ignition system such as a diesel engine. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Figure 2:
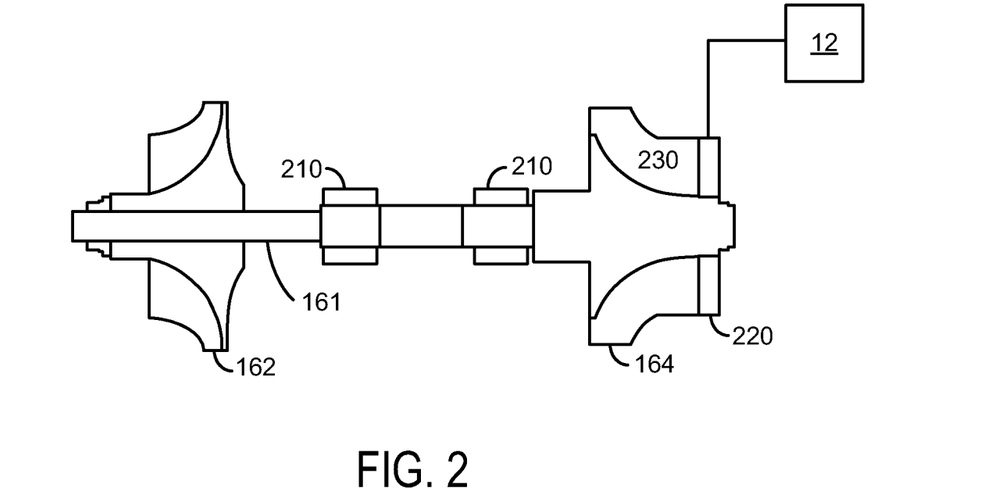
FIGS. 2 and 3 show example devices for adjusting engine exhaust backpressure.

Referring now to FIG. 2, a cross section of a first turbocharger for compressing engine inlet air and increasing engine exhaust backpressure is shown. Turbine 164 is shown mechanically coupled to shaft 161. Compressor 162 is also shown mechanically coupled to shaft 161. Shaft 161 is supported via bearings 210 and turbine vane position adjuster 220 receives commands from controller 12 to open or close turbine vanes 230.

During engine operation, exhaust gases act on turbine 164 to cause it to rotate. The exhaust gases impart a force to turbine vanes 230 that may be varied depending on the position of turbine vanes 230. In one example, exhaust gases impart greater force to turbine vanes 230 when turbine vanes are in a closed position. Exhaust gases impart less force to turbine vanes 230 when turbine vanes are in a fully open position. Turbine vanes 230 may be varied to a plurality of positions between fully closed and fully open. Engine exhaust backpressure increases when turbine vanes are closed relative to engine exhaust backpressure when turbine vanes are open, and while the engine operates at similar engine operating conditions.

Figure 3:
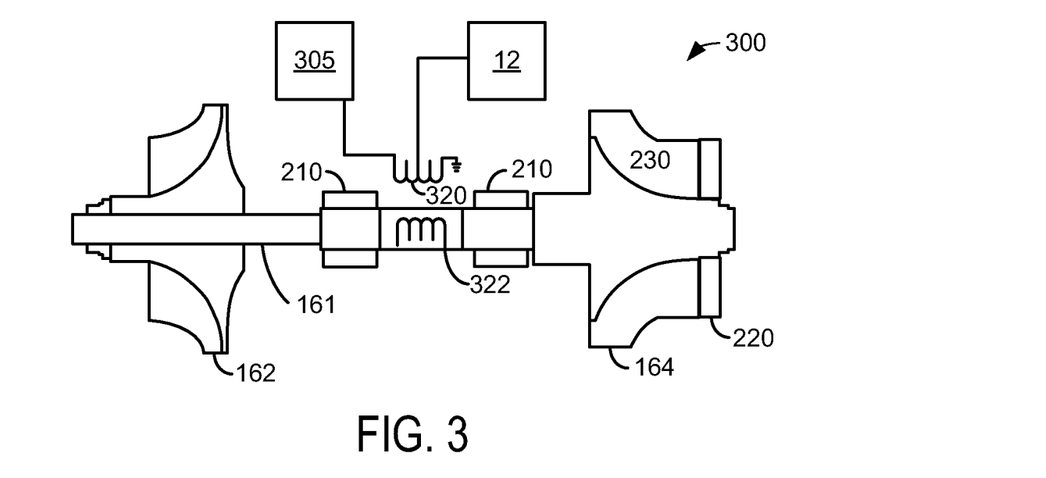

Referring now to FIG. 3, a cross section of an alternative device 300 for compressing engine inlet air and increasing engine exhaust backpressure is shown. The components of device 300 that have the same numbers as the components of the device shown in FIG. 2 are the same components as shown in FIG. 2. Further, components having the same numbers operate in the same way as discussed with regard to FIG. 2.

Device 300 is an electric machine that includes a first winding 320 and permanent magnets or second winding 322. Controller 12 selectively supplies current to winding 320 to create a magnetic field which can increase or decrease the rotational resistance of turbine 164, shaft 161, and compressor 162. The magnetic field produced by supplying coil 320 with current interacts with a magnetic field of shaft 161 produced by permanent magnets or windings 322. When electrical device 322 is a winding, current may be supplied to the winding to produce a magnetic field that interacts with the field produce via winding 320. The two magnetic fields may act to both accelerate shaft 161 and generate electrical energy from shaft 161 depending on current flow to the respective coils and the magnetic fields produced by the current or permanent magnets. Device 300 may also supply electrical energy to electric storage device (e.g., a battery, capacitor, or inductor) when operated as a generator/alternator.

Thus, the system of FIGS. 1-3 provides for an engine system, comprising: an engine; a turbocharger coupled to the engine, the turbocharger including adjustable turbine vanes; and a controller including non-transient instructions to adjust a turbine vane position in response to a request to stop the engine, the position adjusted to increase engine exhaust backpressure. In this way, position of turbine vanes may be adjusted to control engine speed during engine stopping. The engine system includes where the position of the adjustable turbine vanes is adjusted to increase the engine exhaust backpressure by less than a threshold amount at a time before a last cylinder to combust an air-fuel mixture prior to engine stop inducts an amount of air participating in combustion after the request to stop the engine. The engine system includes where the position of the adjustable turbine vanes is adjusted at a time after a last cylinder to combust an air-fuel mixture prior to engine stop inducts an amount of air.

In another example, the engine system further comprises at least partially opening the adjustable turbine vanes after the engine exhaust backpressure is increased. The engine system includes where at least partially opening the adjustable turbine vanes occurs in response to an operator change of mind condition. The engine system includes where at least partially opening the adjustable turbine vanes is related to engine stopping time. The engine system further comprises a turbocharger turbine torque adjusting device, and additional instructions to increase a negative torque applied to the turbocharger by the turbocharger turbine torque adjusting device.

The system of FIGS. 1-3 also provides for an engine system, comprising: an engine; a turbocharger coupled to the engine, the turbocharger including adjustable turbine vanes; and a controller including non-transient instructions to adjust a turbine vane position in response to a request to stop the engine, the turbine vane position adjusted to increase engine exhaust backpressure during engine stopping, and additional non-transient instructions to increase engine exhaust backpressure during engine starting via adjusting the turbine vane position. The engine system includes where the vane position is adjusted in response to engine speed during engine starting.

The engine system includes where the vane position is adjusted to increase exhaust backpressure in response to engine speed being greater than a desired engine speed.

In another example, the engine system further comprises an electrical device that is in electrical communication with the turbocharger turbine shaft. The engine system includes where the electrical device is a motor, and further comprising additional instructions to increase a negative motor torque in response to the request to stop the engine. The engine system further comprises additional instructions to increase a negative motor torque during engine starting. The engine system further comprises additional instructions to adjust the negative motor torque in response to engine speed.

Figure 4:
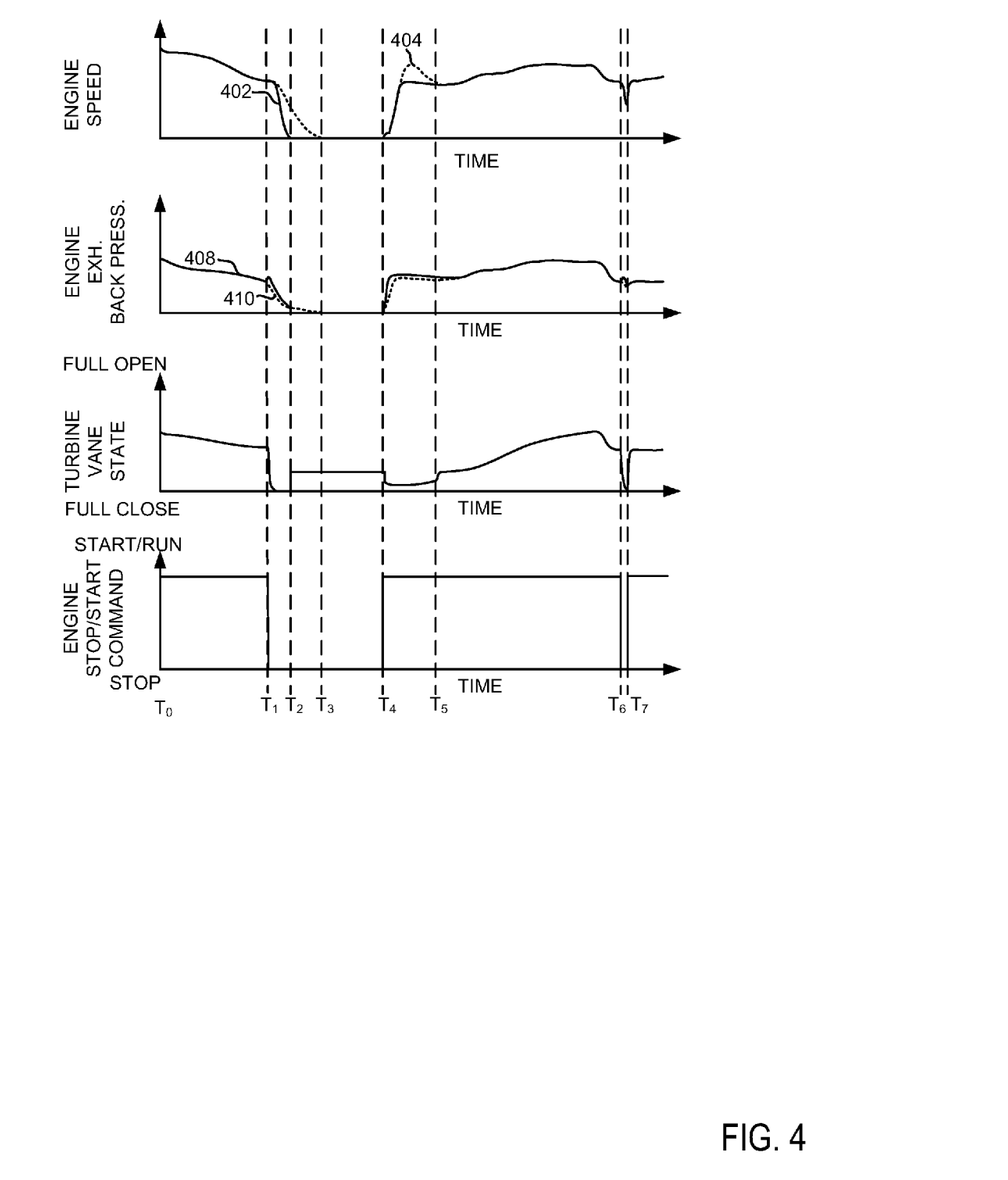
FIGS. 4 and 5 show simulated engine starting and stopping sequences.

Referring now to FIG. 4, a simulated engine operating sequence is shown. The operating sequence may be provided via executing instructions of the method of FIGS. 8 and 9 within controller 12 of the system described in FIGS. 1-3. Vertical markers $T_0$-$T_7$ represent times of particular interest during the sequence.

The first plot from the top of FIG. 4 shows engine speed versus time. The Y axis represents engine speed and engine speed increases in the direction of the Y axis arrow. The X axis represents time and time increases from the left hand side of FIG. 4 to the right hand side of FIG. 4. Solid line 402 represents the engine speed trace according to the method of FIGS. 8 and 9 during the present sequence. Dashed line 404 represents an engine speed trace according to prior art methods for engine starting and stopping.

The second plot from the top of FIG. 4 shows engine exhaust backpressure (e.g., pressure that develops in engine cylinder exhaust ports and/or in exhaust manifold 48 of FIG. 1) versus time. The Y axis represents engine exhaust backpressure and engine exhaust backpressure increases in the direction of the Y axis arrow. The X axis represents time and time increases from the left hand side of FIG. 4 to the right hand side of FIG. 4. Solid line 408 represents the engine exhaust backpressure trace according to the method of FIGS. 8 and 9 during the present sequence. Dashed line 410 represents an engine exhaust backpressure trace according to prior art methods for engine starting and stopping.

The third plot from the top of FIG. 4 shows turbocharger turbine vane state versus time. The Y axis represents turbocharger vane state and turbine vanes are fully closed when the signal is at the level of the X axis. The turbine vanes are fully open when the signal is at a level near the Y axis arrow. The X axis represents time and time increases from the left hand side of FIG. 4 to the right hand side of FIG. 4.

The fourth plot from the top of FIG. 4 shows a state of an engine stop/start command versus time. The Y axis represents the engine stop/start command state and engine stop/start command indicates the engine is operating or is to be started when the engine stop/start command is at a higher level. The engine stop/start state indicates that the engine is stopped or is to be stopped when the engine stop/start command is at a lower level. The X axis represents time and time increases from the left hand side of FIG. 4 to the right hand side of FIG. 4.

At time $T_0$, the engine is operating at a middle level engine speed and the engine exhaust backpressure is at a middle engine exhaust backpressure. The turbocharger turbine vane state is at a middle level indicating that the turbine vanes are partially open. The engine stop/start command is at a higher level indicating that the engine is operating and not being requested to stop rotation.

At time $T_1$, an engine stop request is asserted and/or indicated by the state of the engine stop/start command transitioning from a higher level to a lower level. The engine stop/start request may be generated when a group of conditions to automatically stop an engine without an operator directly requesting an engine stop via a dedicated input that has a sole function of stopping and/or stopping an engine (e.g., an ignition switch) are met. In this example, the engine stop request is made in response to vehicle speed reaching zero, a driver depressing a brake pedal, and when an accelerator pedal is not depressed.

The engine is shutdown via stopping fuel flow and spark to the engine in response to the engine stop/start request transitioning to a lower level. The turbine vane state is adjusted to an increasingly closed state in response to the engine stop/start request transitioning to the lower level. In one example, the turbine vanes are adjusted to an increasingly closed state after a cylinder inducts air for a last combustion event before engine stop. In other examples, the adjustable turbine vanes are adjusted to increase the engine exhaust backpressure by less than a threshold amount before a last cylinder to combust an air-fuel mixture prior to engine stop inducts an amount of air. In this way, the last combustion event before engine stop is not affected by adjusting turbocharger vane position.

Engine exhaust backpressure briefly increases in response to adjusting the turbine vane state to a more closed position. However, engine exhaust pressure decreases as engine speed decreases. Further, the engine exhaust backpressure of trace 408 is greater than the engine exhaust backpressure of trace 410. By increasing engine exhaust backpressure, engine pumping work increases, thereby extracting more kinetic energy from the rotating engine so that the engine stops faster as indicated by engine speed trace 402 decreasing faster than engine speed trace 404.

Between time $T_1$ and time $T_2$, engine speed decreases in response to absence of spark and fuel. Further, engine speed decreases at an increased rate in response to the higher engine exhaust backpressure.

At time $T_2$, engine speed for engine speed trace 402 reaches zero and the turbine vane state is adjusted to increase the turbine vane opening amount. By opening the turbine vanes in response to engine speed reaching zero, exhaust backpressure is reduced as the engine is stopped so that exhaust gas may flow out of engine cylinders more easily so as to improve engine restarting via reducing exhaust gas residuals in engine cylinders. The engine stop/start command remains at a lower level indicating that the engine is to remain in a stopped state (e.g., a zero rotation state).

At time $T_3$, engine speed reaches zero when an engine is operated according to the prior art methods. Time $T_3$ occurs at a later time than time $T_2$ because less engine pumping work is present when the engine is stopped according to prior art methods that are comprised of simply ceasing fuel flow and spark to the engine.

At time $T_4$, an engine restart request is made as indicated by the engine stop/start command transitioning from a lower level to a higher level. The engine stop/start command transitions in response to a driver releasing a brake pedal of a vehicle. The engine is cranked and started by supplying spark and fuel to the engine. The turbine vane state is adjusted to a less open state that increases exhaust flow resistance within the engine exhaust system in response to the engine stop/start command transitioning to an engine start/operate condition. Further, if the engine is in communication with a torque converter, the torque converter transfers less torque to vehicle wheels when engine speed is lower.

Figure 8:
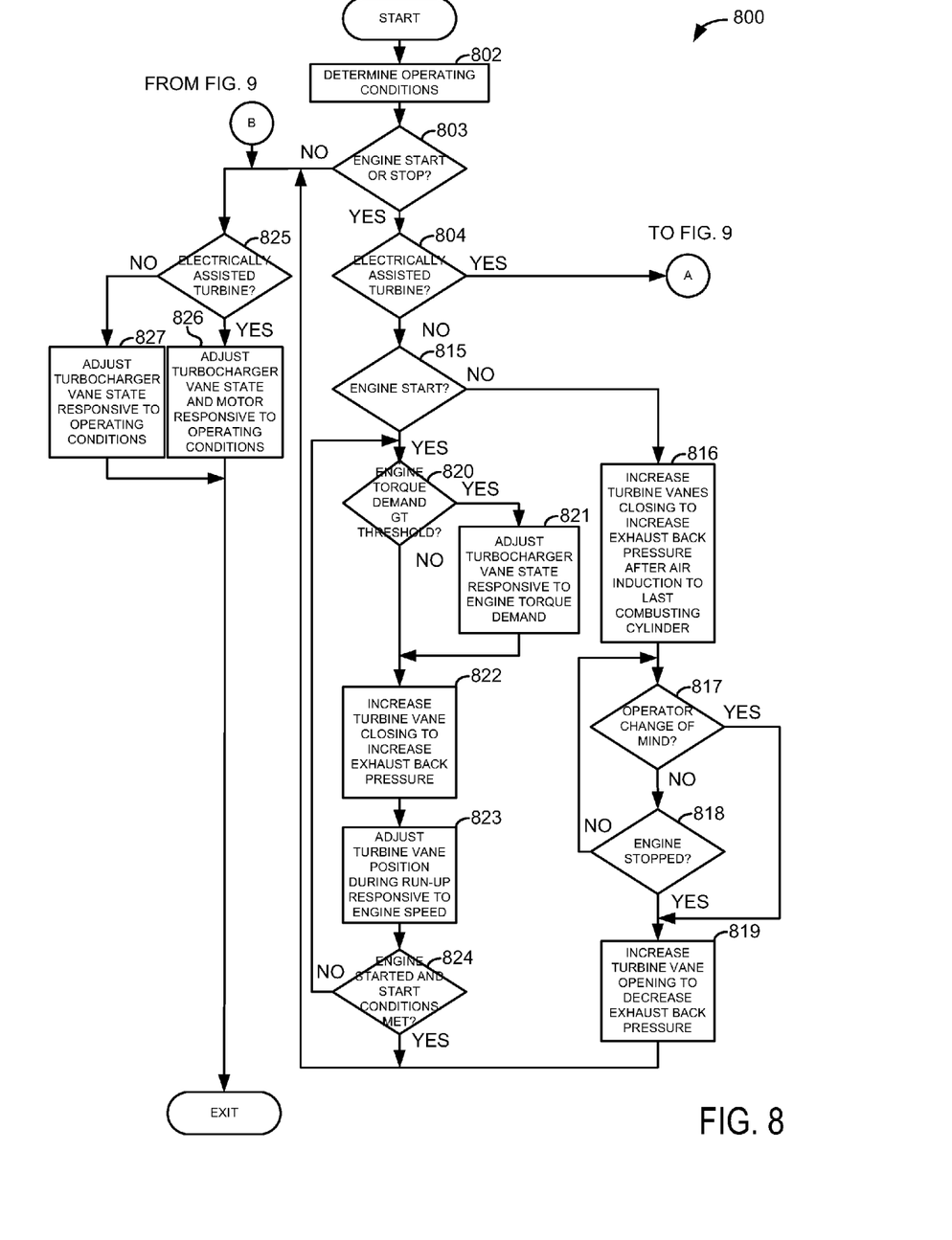
FIGS. 8 and 9 show an example method for operating an engine.
Figure 9:
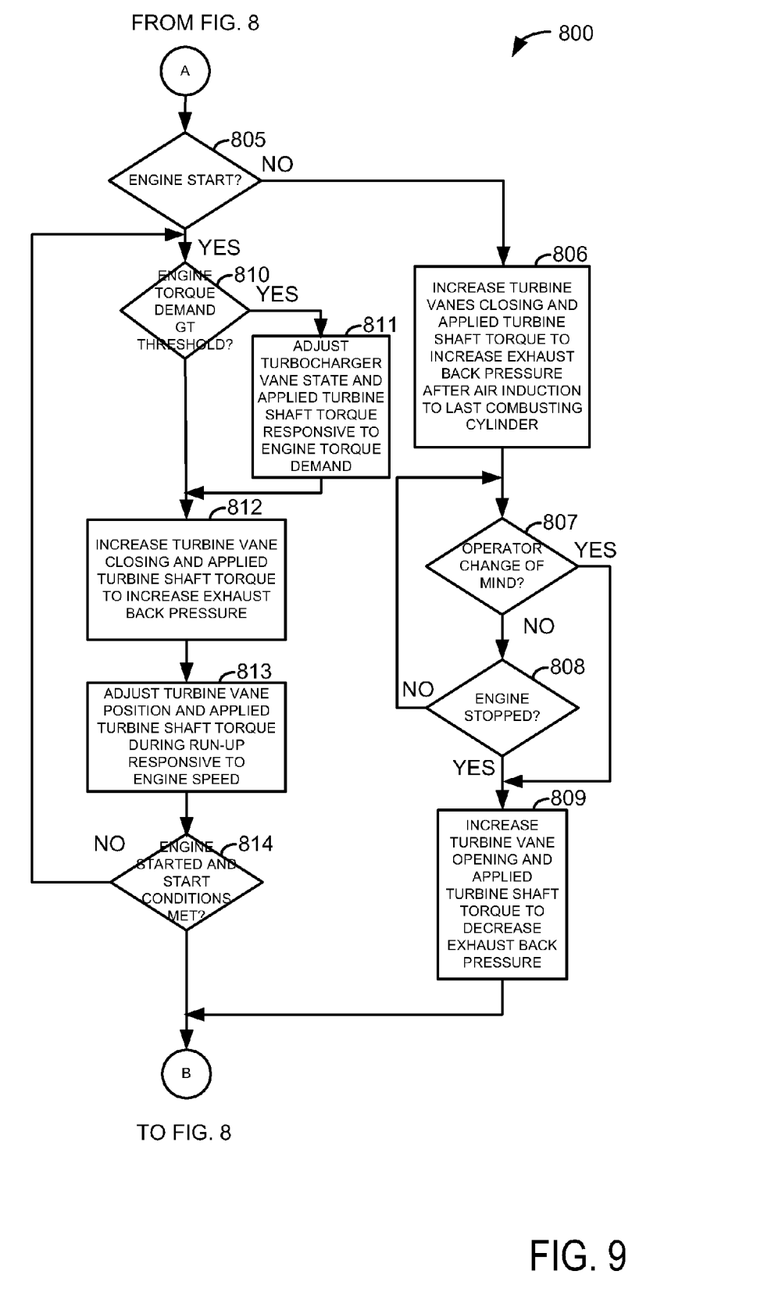

Between time $T_4$ and time $T_5$, engine speed increases and exhaust backpressure increases with increasing engine speed. Further, the turbine vane state is adjusted in response to the actual engine speed. In one example, the turbine vane state is adjusted in response to a difference between a desired engine speed and an actual engine speed. The engine stop/start command remains at a higher level indicating that the engine is started. The engine speed according to the method of FIGS. 8 and 9 is less than the engine speed of prior art methods. Further, engine exhaust backpressure according to the method of FIGS. 8 and 9 is greater than the engine exhaust backpressure of prior art methods. Thus, the higher exhaust backpressure of the method according to FIGS. 8 and 9 reduces engine speed during engine starting so that torque transmitted to vehicle wheels is reduced when the vehicle is in gear.

At time $T_5$ and continuing until time $T_6$, the engine first reaches a stabilized idle condition and then the turbine vane state is adjusted in response to engine speed and requested engine torque. In other words, engine pumping work is reduced while a desired amount of engine air is provided to meet the engine torque request.

At time $T_6$, the engine start/stop request transitions to a lower state to initiate automatic engine stopping in response to a driver depressing a brake, vehicle speed reaching zero, and absence of accelerator pedal depression. The turbine vane state is adjusted to a more closed position in response to the engine start/stop request transitioning to a lower state, and exhaust backpressure increases in response to the turbine vanes moving to a more closed position. The engine speed also begins to decrease as spark and fuel delivery cease.

At time $T_7$, the engine start/stop request transitions from a lower state to a higher state to indicate that the driver has had a change of mind (COM) and wishes for the engine to continue to operate and rotate. The engine stop/start request transitions in response to a driver releasing a brake pedal. The turbine vane state is adjusted to increase the vane opening amount in response to the engine stop/start request transitioning to the higher level. The engine exhaust backpressure decreases in response to increasing an opening amount of the turbine vanes. Engine speed also begins to increase and spark and fuel flow to the engine resumes.

In this way, turbine vane position may be adjusted in response to engine stopping and starting requests. Further, turbine vane positions may be adjusted when a driver has a change of mind after engine shutdown has started and before engine speed reaches zero.

Figure 5:
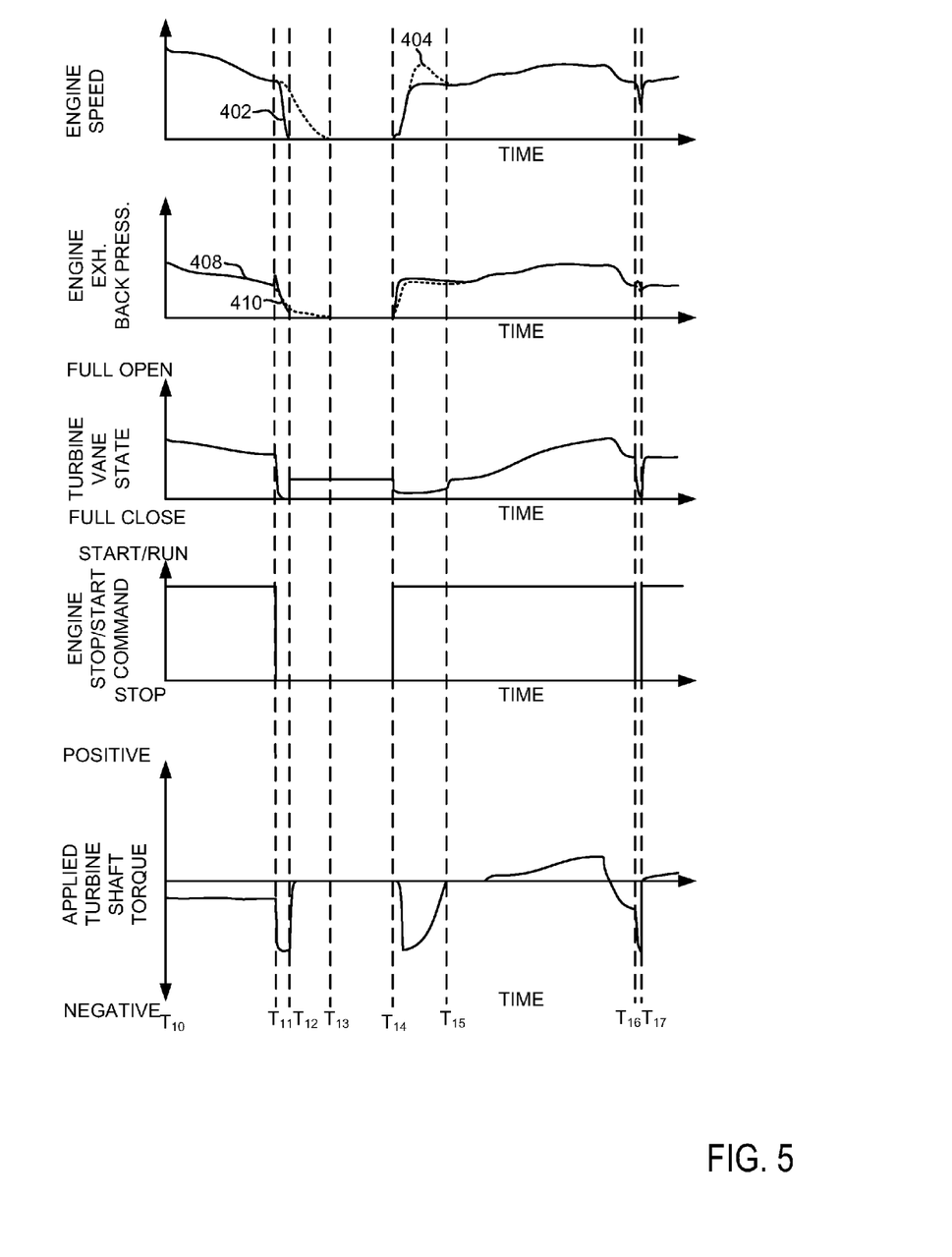

Referring now to FIG. 5, another simulated engine operating sequence is shown. The operating sequence may be provided via executing instructions of the method of FIGS. 8 and 9 within controller 12 of the system described in FIGS. 1-3. Vertical markers $T_{10}$-$T_{17}$ represent times of particular interest during the sequence. The plots of FIG. 5 having the same names and element numbers indicating traces as the plots of FIG. 4 are as described and perform as described in FIG. 4. Therefore, for the sake of brevity, only the differences are described in FIG. 5.

The fifth plot from the top of FIG. 5 shows applied turbine shaft torque from a device such as an electric motor as described in FIG. 3. In particular, applied turbine shaft torque is a torque applied by an electric machine incorporated into the turbine shaft of a turbocharger. A positive shaft torque applied by the electric machine acts to accelerate the turbine shaft and a negative torque applied by the electric machine acts to restrict motion of the turbine shaft. The electric machine acts as a motor when a positive torque is applied to the turbine shaft. The electric machine acts as a generator/alternator when a negative torque is applied to the turbine shaft. The applied negative turbine shaft torque increases in the direction of the downward facing Y axis arrow. The applied positive turbine shaft torque increases in the direction of the upward facing Y axis arrow. An applied turbine shaft torque at the X axis level is zero applied turbine shaft torque.

At time $T_{10}$, the engine is operating at a middle level engine speed and the engine exhaust backpressure is at a middle engine exhaust backpressure. The turbocharger turbine vane state is at a middle level indicating that the turbine vanes are partially open. The engine stop/start command is at a higher level indicating that the engine is operating and not being requested to stop rotating. The applied turbine shaft torque is negative indicating that the electric machine is acting as a generator/alternator as the engine desired torque decreases in response to a driver torque demand. The generator/alternator may supply electrical power to an electric energy storage device when supplying a negative torque to the turbine shaft.

At time $T_{11}$, an engine stop request is indicated by the state of the engine stop/start command transitioning from a higher level to a lower level. The engine stop/start request may be generated when a group of conditions to automatically stop an engine without an operator directly requesting an engine stop via a dedicated input that has a sole function of stopping and/or stopping an engine (e.g., an ignition switch) are met. In this example, the engine stop request is made in response to vehicle speed reaching zero, a driver depressing a brake pedal, and when an accelerator pedal is not depressed.

The engine is shutdown via stopping fuel flow and spark to the engine in response to the engine stop/start request transitioning to a lower level. The turbine vane state is adjusted to an increasingly closed state in response to the engine stop/start request transitioning to the lower level. In one example, the turbine vanes are adjusted to an increasingly closed state after a cylinder inducts air for a last combustion event before engine stop. In other examples, the adjustable turbine vanes are adjusted to increase the engine exhaust backpressure by less than a threshold amount before a last cylinder to combust an air-fuel mixture prior to engine stop inducts an amount of air. In this way, the last combustion event before engine stop is not affected by adjusting turbocharger vane position.

The applied turbine shaft torque is increased in the negative direction indicating that it is becoming increasingly more difficult to rotate the turbine shaft in response to the engine stop/start command transitioning to the lower level. Thus, it takes a higher exhaust pressure to rotate the turbine shaft when a higher negative torque is applied to the turbine shaft.

Engine exhaust backpressure briefly increases in response to adjusting the turbine vane state to a more closed position and in response to the increased applied negative turbine shaft torque. However, engine exhaust backpressure decreases as engine speed decreases. It should also be noted that exhaust backpressure increases to a higher level than during similar conditions shown in FIG. 4 where no electrical machine is present. Additionally, the engine exhaust backpressure of trace 408 is greater than the engine exhaust backpressure of trace 410. By increasing engine exhaust backpressure, engine pumping work increases, thereby extracting more kinetic energy from the rotating engine so that the engine stops faster as indicated by engine speed trace 402 decreasing faster than engine speed trace 404.

Between time $T_{11}$ and time $T_{12}$, engine speed decreases in response to absence of spark and fuel. Further, engine speed decreases at an increased rate in response to the higher engine exhaust backpressure.

At time $T_{12}$, engine speed for engine speed trace 402 reaches zero and the turbine vane state is adjusted to increase the turbine vane opening amount. By opening the turbine vanes in response to engine speed reaching zero, exhaust backpressure is reduced as the engine is stopped so that exhaust gas may flow out of engine cylinders more easily so as to improve engine restarting via reducing exhaust gas residuals in engine cylinders. Further, the applied negative turbine shaft torque is also decreased to zero to allow the turbine to rotate. The engine stop/start command remains at a lower level indicating that the engine is to remain in a stopped state (e.g., a zero rotation state).

At time $T_{13}$, engine speed reaches zero when an engine is operated according to the prior art methods. The applied turbine shaft torque remains at zero.

At time $T_{14}$, an engine restart request is made as indicated by the engine stop/start command transitioning from a lower level to a higher level. The engine stop/start command transitions in response to a driver releasing a brake pedal of a vehicle. The engine is cranked and started by supplying spark and fuel to the engine. The turbine vane state is adjusted to a less open state that increases exhaust flow resistance within the engine exhaust system in response to the engine stop/start command transitioning to an engine start/operate condition. The applied negative turbine shaft torque also increases so as to reduce turbine movement during engine starting and run-up (e.g., a period of time from when engine rotational speed is equal to zero until engine speed is at idle speed or another predetermined speed).

Between time $T_{14}$ and time $T_{15}$, engine speed increases and exhaust backpressure increases with increasing engine speed. Further, the turbine vane state is adjusted in response to the actual engine speed as is the applied negative turbine shaft torque. In one example, the turbine vane state and applied negative turbine torque are adjusted in response to a difference between a desired engine speed and an actual engine speed. The engine stop/start command remains at a higher level indicating that the engine is started. The engine speed according to the method of FIGS. 8 and 9 is less than the engine speed of prior art methods. Further, engine exhaust backpressure according to the method of FIGS. 8 and 9 is greater than the engine exhaust backpressure of prior art methods. Thus, the higher exhaust backpressure of the method according to FIGS. 8 and 9 reduces engine speed during engine starting so that torque transmitted to vehicle wheels is reduced when the vehicle is in gear.

At time $T_{15}$ and continuing until time $T_{16}$, the engine first reaches a stabilized idle condition and then the turbine vane state is adjusted in response to engine speed and requested engine torque. The applied turbine shaft torque also changes from negative to positive so as to improve air pressure provided to the engine by the compressor. Just before time $T_{16}$, the applied turbine shaft torque turns negative and electrical energy is provided to an electrical energy storage device in response to a driver decreasing an engine torque demand.

At time $T_{16}$, the engine start/stop request transitions to a lower state to initiate automatic engine stopping in response to a driver depressing a brake, vehicle speed reaching zero, and absence of accelerator pedal depression. The turbine state is adjusted to a more closed position and applied turbine negative shaft torque is increased in response to the start/stop request transitioning to a lower state, and exhaust backpressure increases in response to the turbine vanes moving to a more closed position and applied turbine negative shaft torque increasing. The engine speed also begins to decrease as spark and fuel delivery cease.

At time $T_{17}$, the engine start/stop request transitions from a lower state to a higher state to indicate that the driver has had a change of mind (COM) and wishes for the engine to continue to operate and rotate. The engine stop/start request transitions in response to a driver releasing a brake pedal which is interpreted as a COM. The turbine vane state is adjusted to increase the vane opening amount in response to the engine stop/start request transitioning to the higher level and the applied turbine shaft torque is switched from negative to positive. The engine exhaust backpressure decreases in response to increasing an opening amount of the turbine vanes and the change in applied turbine shaft torque. Engine speed also begins to increase and spark and fuel flow to the engine resumes.

In this way, turbine vane position and applied turbine shaft torque may be adjusted in response to engine stopping and starting requests. Further, turbine vane positions and applied turbine shaft torque may be adjusted when a driver has a change of mind after engine shutdown has started and before engine speed reaches zero.

Figure 6:
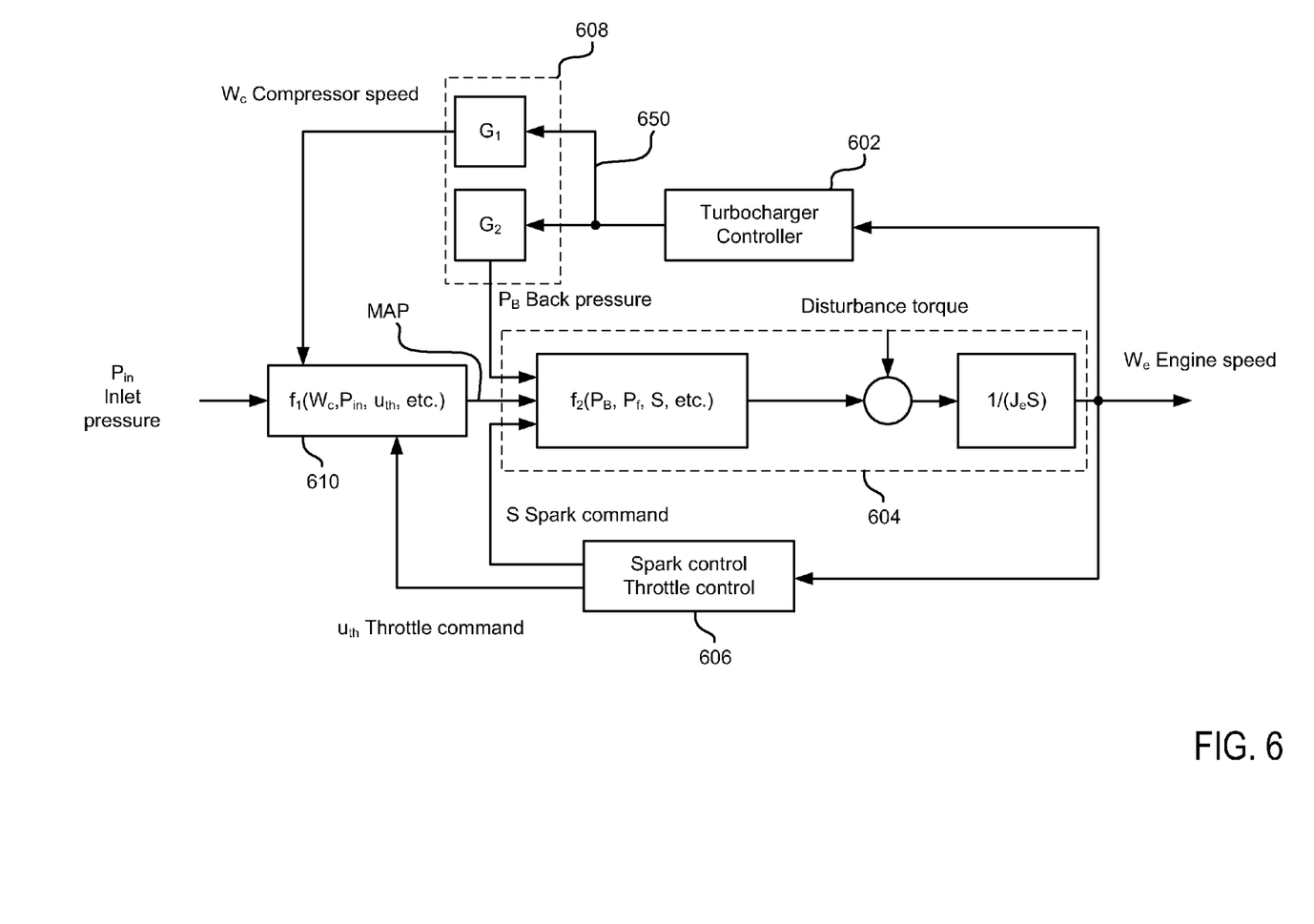
FIGS. 6 and 7 show example system block diagrams.

Referring now to FIG. 6, an example system block diagram for a system that includes a turbocharger with adjustable turbine vanes is shown. The block diagram applies to the system shown in FIGS. 1-3 and the method shown in FIGS. 8 and 9.

Engine model 604 outputs an engine speed as a function $f_2$ of engine exhaust backpressure $P_B$, intake manifold pressure $P_i$, spark $S$, and other variables including but not limited to engine temperature and air temperature. Intake manifold pressure model 610 estimates intake manifold pressure $P_i$ as a function $f_1$ of engine speed $W_c$, air inlet pressure $P_{in}$, throttle position $u_{th}$, and other variables including but not limited to ambient temperature and pressure. Intake manifold pressure model 610 outputs intake manifold pressure.

Spark and throttle controller 606 outputs spark and throttle commands to engine model 604 and intake manifold pressure model 610 in response to engine speed and other variables such as desired engine torque. Turbocharger compressor model 608 outputs a compressor speed to intake manifold pressure model 610 in response to turbocharge vane position command 650 and other variables such as but not limited to compressor pressure ratio. Turbocharger compressor model 608 also outputs an engine backpressure value to engine model 604.

Turbocharger controller 602 outputs a turbocharger vane position command 650 in response to engine speed and other variables such as but not limited to engine speed and engine stop/start command status. Turbocharger controller 602 may operate as described in the method of FIGS. 8 and 9.

Figure 7:
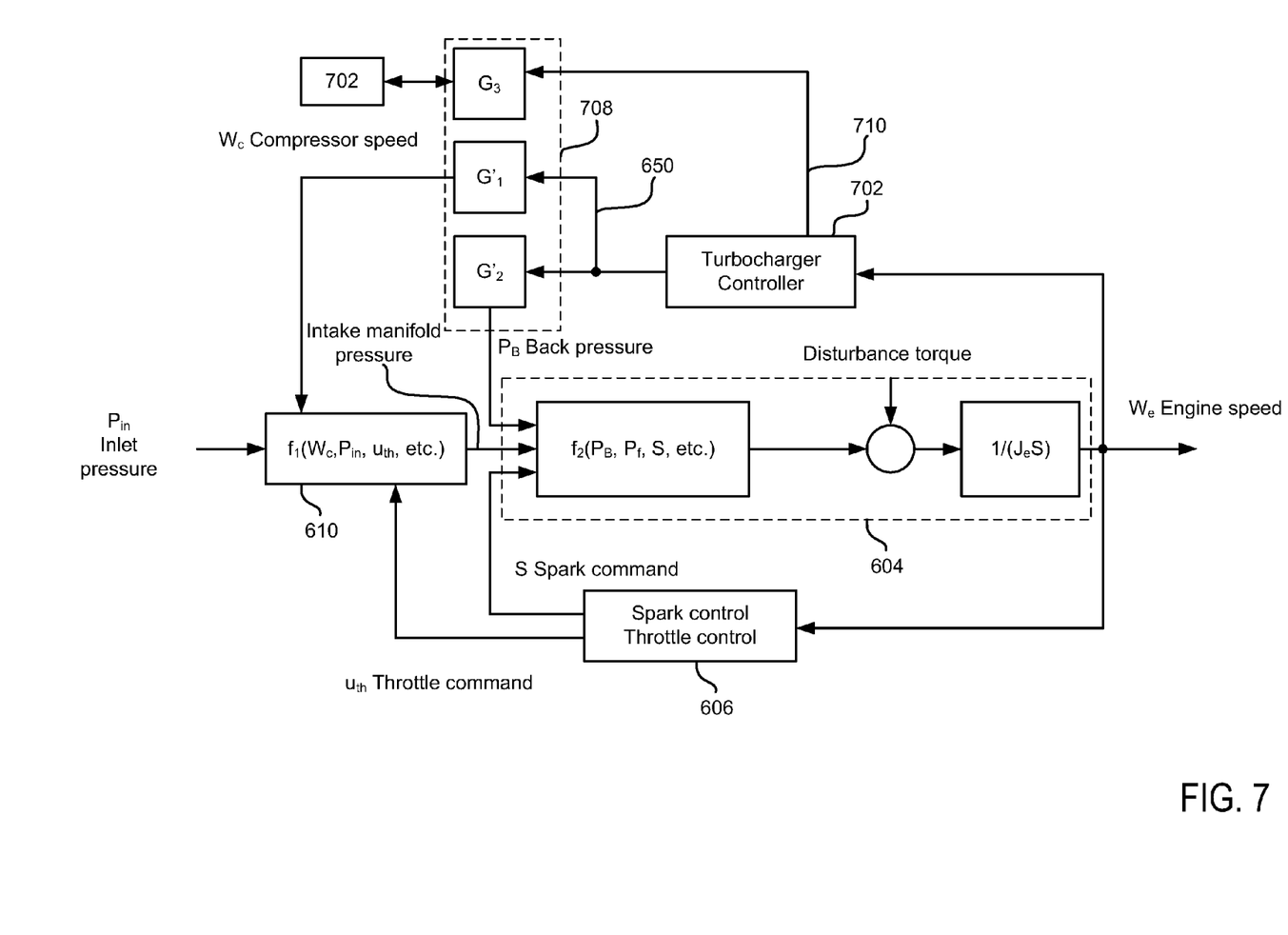

Referring now to FIG. 7, an alternative example system block diagram is shown. The block diagram of FIG. 7 includes elements that have the same numbers as elements in FIG. 6. The elements of FIG. 7 that have the same element numbers as those shown in FIG. 6 are the same and operate the same as described in FIG. 6. Therefore, the description of the same elements is omitted for the sake of brevity. Elements of FIG. 7 that are different from the elements described in FIG. 6 are described.

Turbocharger model 708 includes representations of an electrical machine (e.g., $G_3$) for applying positive or negative turbine shaft torque. Turbocharger model 708 outputs a current estimate to energy storage device model 702. Turbocharger controller 702 includes outputs for vane position command 650 and electric device command 710. Thus, the system describe by FIG. 7 includes adjustments for an electric machine that is in electrical and/or mechanical communication with a turbocharger.

Referring now to FIGS. 8 and 9, an example method for operating an engine is shown. The method of FIGS. 8 and 9 may be stored as non-transitory executable instructions in controller 12 of FIG. 1. The method of FIGS. 8 and 9 may also provide the sequences shown in FIGS. 4 and 5.

At 802, method 800 determines vehicle operating conditions. Vehicle operating conditions may include but are not limited to engine speed, engine load, desired engine torque, brake pedal position, accelerator pedal position, vehicle speed, turbine vane position, and turbine shaft torque application device state. Method 800 proceeds to 803 after operating conditions are determined.

At 803, method 800 judges whether or not an engine stop or engine start request is being made. An engine stop or engine start request may be automatically generated by a controller in response to vehicle conditions other than a dedicated driver input that has a sole purpose of starting and/or stopping an engine. For example, an engine stop request may be made when engine speed is at idle speed, vehicle speed is zero, a vehicle brake is applied, and while an accelerator pedal is not activated. An engine start request may be made when engine speed is zero and when a brake pedal is not applied. A manual engine stop or engine start may be requested by a driver activating a device that has a sole function of starting and/or stopping an engine. If method 800 judges that an engine stop or start is requested, the answer is yes and method 800 proceeds to 804. Otherwise, the answer is no and method 800 proceeds to 825.

At 804, method 800 judges whether or not an electrically assisted turbine is provided with the engine. In one example, a bit may be set in memory to identify whether or not an electrically assisted turbine is present. If method 800 judges that an electrically assisted turbine is present, the answer is yes and method 800 proceeds to 805. Otherwise, the answer is no and method 800 proceeds to 815.

Moving now to FIG. 9, method 800 judges whether or not the engine is being started at 805. In one example, it may be determined that the engine is being started when engine speed is less than a threshold speed and when an engine start request is present. If method 800 judges that the engine is being started, the answer is yes and method 800 proceeds to 810. Otherwise, the answer is no and method 800 proceeds to 806. Thus, the engine is stopping when method 800 proceeds to 806.

At 806, method 800 increases the amount turbocharger turbine vanes are closed and an increasing amount of negative torque is applied to the turbocharger turbine shaft. The turbocharger turbine vanes may be closed by adjusting a position of an electrical actuator. The negative torque applied to the turbocharger turbine shaft may be increased via increasing a field current supplied to the generator/alternator. In one example, the position of turbine vanes and negative torque applied by generator/alternator may be adjusted in response to engine speed during engine stopping. For example, if actual engine speed is greater than desired engine speed during engine stopping after spark and fuel are deactivated, turbine vanes are closed further and additional negative torque is applied by the generator/alternator to the turbocharger turbine shaft. If actual engine speed is less than desired engine speed during engine stopping after spark and fuel are deactivated, turbine vanes are opened further and less negative torque is applied by the generator/alternator to the turbocharger turbine shaft.

In one example, the adjustments to the turbine vanes and generator/alternator are made at a time after a last cylinder to combust an air-fuel mixture after the engine stop request inducts its last amount of air participating in combustion after the engine stop request. In another example, the position of the adjustable turbine vanes and the generator/alternator negative torque is adjusted to increase the engine exhaust backpressure by less than a threshold amount at a time before a last cylinder to combust an air-fuel mixture prior to engine stop inducts an amount of air participating in combustion. Thus, by adjusting turbine vane position and field current supplied to the generator/alternator, it may be possible to adjust engine exhaust backpressure and engine speed during engine stopping. Method 800 proceeds to 807 after turbocharger vane position and negative torque is applied to the turbocharger turbine shaft.

At 807, method 800 judges whether or not a driver change of mind occurs after an engine stop request. A change of mind may be determined from a driver releasing a brake pedal or applying an accelerator pedal after an engine stop request and before the engine stops rotating. If method 800 determines that a change of mind exists, the answer is yes and method 800 proceeds to 809. Otherwise, the answer is no and method 800 proceeds to 808.

At 808, method 800 judges whether or not the engine has stopped rotating. The engine may be judged to have stopped rotating based on a signal from a crankshaft position sensor. If method 800 judges that the engine has stopped rotating, the answer is yes and method 800 proceeds to 809. Otherwise, the answer is no and method 800 returns to 807.

At 809, method 800 increases a turbine vane opening amount and decreases an amount of negative torque applied to the turbocharger turbine shaft. The negative torque applied to the turbocharger turbine shaft may be decreased via decreasing field current supplied to the generator/alternator. By increasing the turbocharger turbine vane opening amount and negative torque applied to the turbocharger turbine shaft, exhaust gases upstream of the turbine may be released to downstream of the turbine so that the amount of exhaust gas in engine cylinders is reduced. Lowering the amount of exhaust gas in engine cylinders may improve engine starting since combustion may be more stable in cylinder that are less diluted with exhaust gas. Method 800 proceeds to 825 after turbine vanes and the generator/alternator are adjusted.

At 810, method 800 judges whether or not an engine torque demand is greater than a threshold engine torque demand. In one example, an engine torque demand is provided by an accelerator pedal position that is converted into an engine torque demand via an accelerator pedal position transfer function. In other examples, the engine torque demand may be provided by a controller. If method 800 judges the engine torque demand is greater than a threshold torque demand, the answer is yes and method 800 proceeds to 811. Otherwise, the answer is no and method 800 proceeds to 812.

At 811, method 800 adjusts turbocharger turbine vane state and torque applied to the turbine shaft responsive to engine demand torque. In one example, the turbine vane opening amount is increased and the applied turbine shaft torque is switched from a negative torque to a positive torque. Increasing the turbine vane opening amount decreases the force applied by exhaust gases to the turbine and reduces engine exhaust backpressure. Switching the applied turbine shaft torque from negative to positive via switching the electrical device from a generator/alternator to a motor brings the compressor up to operating speed quicker so that air flow to the engine increases. The change in turbine vane position and applied turbine shaft torque may be adjusted in proportion to the engine torque demand. Method 800 proceeds to 812 after turbine vanes and applied turbine shaft torque are adjusted.

At 812, method 800 increases the turbine vane closing amount and the applied negative turbine torque to increase engine exhaust backpressure. In one example, the turbine vane position and negative torque are commanded to a position that is varied with barometric pressure. For example, the turbine vane closing amount is decreased as barometric pressure increases. Thus, the adjustments at 811 and 812 may combine to adjust the turbine vanes and applied turbine shaft torque in a way that accounts for changes in engine torque demand and engine exhaust backpressure during engine starting. Method 800 proceeds to 813 after turbine vanes and applied turbine shaft torque adjustments are made.

At 813, method 800 adjusts turbine vane position and applied turbine shaft torque in response to engine speed during engine run-up. For example, if engine speed is greater than a desired engine speed, turbine vane closing amount is increased and applied negative turbine shaft torque is increased. Increasing the turbine vane closing amount and the applied negative torque increases engine exhaust backpressure so as to increase engine internal EGR (e.g., exhaust residuals that remain in the cylinder after the exhaust valve closes during a cylinder cycle). The increased internal EGR can reduce engine torque since less oxygen may be able to participate in combustion within individual cylinders. Similarly, if engine speed is less than desired engine speed, turbine vane opening amount is increased and applied negative turbine torque is decreased so as to reduce engine exhaust backpressure. The desired engine speed during run-up may be stored as an engine speed trajectory in controller memory. Method 800 proceeds to 814 after turbine vane position and applied turbine shaft torque are adjusted in response to engine speed.

At 814, method 800 judges whether or not the engine has started and if selected conditions are met. Method 800 may judge that the engine has started when engine speed is greater than a threshold engine speed. Additionally, other conditions such as time since engine stop greater than a threshold time and engine speed greater than a threshold speed may also have to be satisfied to answer yes before proceeding to 825. If the engine is started and selected operating conditions are met, the answer is yes and method 800 proceeds to 825. Otherwise, the answer is no and method 800 returns to 810.

Returning now to FIG. 8, method 800 judges whether or not the engine is being started at 815. It may be determined that the engine is being started when engine speed is less than a threshold speed and when an engine start request is present. If method 800 judges that the engine is being started, the answer is yes and method 800 proceeds to 820. Otherwise, the answer is no and method 800 proceeds to 816. Thus, the engine is stopping when method 800 proceeds to 816.

At 816, method 800 increases the amount turbocharger turbine vanes are closed. The turbocharger turbine vanes may be closed by adjusting a position of an electrical actuator. In one example, the position of turbine vanes may be adjusted in response to engine speed during engine stopping.

In one example, the adjustments to the turbine vanes are made at a time after a last cylinder to combust an air-fuel mixture after the engine stop request inducts its last amount of air participating in combustion after the engine stop request. In another example, the position of the adjustable turbine vanes are adjusted to increase the engine exhaust backpressure by less than a threshold amount at a time before a last cylinder to combust an air-fuel mixture prior to engine stop inducts an amount of air participating in combustion. Thus, by adjusting turbine vane position, it may be possible to adjust engine exhaust backpressure and engine speed during engine stopping. Method 800 proceeds to 817 after turbocharger vane position and negative torque is applied to the turbocharger turbine shaft.

At 817, method 800 judges whether or not a driver change of mind occurs after an engine stop request. A change of mind may be determined from a driver releasing a brake pedal or applying an accelerator pedal after an engine stop request and before the engine stops rotating. If method 800 determines that a change of mind exists, the answer is yes and method 800 proceeds to 819. Otherwise, the answer is no and method 800 proceeds to 818.

At 818, method 800 judges whether or not the engine has stopped rotating. The engine may be judged to have stopped rotating based on a signal from a crankshaft position sensor. If method 800 judges that the engine has stopped rotating, the answer is yes and method 800 proceeds to 819. Otherwise, the answer is no and method 800 returns to 817.

At 819, method 800 increases a turbine vane opening amount. By increasing the turbocharger turbine vane opening amount, exhaust gases upstream of the turbine may be released to downstream of the turbine so that the amount of exhaust gas in engine cylinders is reduced. Lowering the amount of exhaust gas in engine cylinders may improve engine starting since combustion may be more stable in cylinder that are less diluted with exhaust gas. Method 800 proceeds to 825 after turbine vanes are adjusted.

At 820, method 800 judges whether or not an engine torque demand is greater than a threshold engine torque demand. If method 800 judges the engine torque demand is greater than a threshold torque demand, the answer is yes and method 800 proceeds to 821. Otherwise, the answer is no and method 800 proceeds to 822.

At 821, method 800 adjusts turbocharger turbine vane state responsive to engine demand torque. In one example, the turbine vane opening amount is increased. Increasing the turbine vane opening amount decreases the force applied by exhaust gases to the turbine and reduces engine exhaust backpressure. The change in turbine vane position may be adjusted in proportion to the engine torque demand. Method 800 proceeds to 822 after turbine vanes are adjusted.

At 812, method 800 increases the turbine vane closing amount and the applied negative turbine torque to increase engine exhaust backpressure. In one example, the turbine vane position is commanded to a position that is varied with barometric pressure. For example, the turbine vane closing amount is decreased as barometric pressure increases. Thus, the adjustments at 821 and 822 may combine to adjust the turbine vanes in a way that accounts for changes in engine torque demand and engine exhaust backpressure during engine starting. Method 800 proceeds to 823 after turbine vane adjustments are made.

At 823, method 800 adjusts turbine vane position in response to engine speed during engine run-up. For example, if engine speed is greater than a desired engine speed, turbine vane closing amount is increased. Increasing the turbine vane closing amount increases engine exhaust backpressure so as to increase engine internal EGR. The increased internal EGR can reduce engine torque since less oxygen may be able to participate in combustion within individual cylinders. Similarly, if engine speed is less than desired engine speed, turbine vane opening amount is increased so as to reduce engine exhaust backpressure. Method 800 proceeds to 824 after turbine vane position is adjusted in response to engine speed.

At 824, method 800 judges whether or not the engine has started and if selected conditions are met. Method 800 may judge that the engine has started when engine speed is greater than a threshold engine speed. Additionally, other conditions such as time since engine stop greater than a threshold time and engine speed greater than a threshold speed may also have to be satisfied to answer yes before proceeding to 825. If the engine is started and selected operating conditions are met, the answer is yes and method 800 proceeds to 825. Otherwise, the answer is no and method 800 returns to 820.

At 825, method 800 judges whether or not an electrically assisted turbine is present. In one example, a bit may be set in memory to identify whether or not an electrically assisted turbine is present. If method 800 judges that an electrically assisted turbine is present, the answer is yes and method 800 proceeds to 826. Otherwise, the answer is no and method 800 proceeds to 827.

At 826, method 800 adjusts turbocharger turbine vane state and an electrical device in response to operating conditions. In one example, the turbine vane state is adjusted responsive to desired engine torque, exhaust system backpressure, and compressor pressure ratio. For example, when engine speed is low and desired torque is high, the turbine vanes are adjusted to a more closed position. When engine speed is at a middle level and engine torque demand is at a middle level, the turbine vanes are adjusted to a more open position.

The electrical device applying torque to the turbine shaft may operate to provide positive torque to the turbine shaft when an increasing engine torque command is present and when engine speed is less than a threshold speed. On the other hand, the electrical device may operate to provide negative torque to the turbine shaft and recharge an energy storage device when a decreasing engine torque command is present and when engine speed is less than a threshold speed. Method 800 proceeds to exit after the turbine vanes and the electrical device have been adjusted.

At 826, method 800 adjusts turbocharger turbine vane state in response to operating conditions. In one example, the turbine vane state is adjusted responsive to desired engine torque, exhaust system backpressure, and compressor pressure ratio. Method 800 proceeds to exit after turbine vanes area adjusted.

Thus, the method of FIGS. 8 and 9 provides for an engine control method, comprising: adjusting a vane position of a turbocharger to increase engine exhaust backpressure in response to engine stopping and starting requests; and adjusting the vane position of the turbocharger to decrease engine exhaust backpressure after adjusting the vane position of the turbocharger to increase engine exhaust backpressure during engine stopping. The engine control method includes where engine stopping includes engine rotation during engine stop. The engine control method further comprises adjusting the vane position in response to engine speed during engine run-up.

In another example, the engine control method further comprises increasing a negative torque of an electric machine in communication with the turbocharger during engine stopping and engine starting. The engine control method further comprises adjusting the vane position to at least partially open turbocharger turbine vanes during a driver change of mind condition during the engine stopping. The engine control method further comprises adjusting the vane position during the engine starting in response to an engine torque demand during engine run-up.

As will be appreciated by one of ordinary skill in the art, the method described in FIGS. 8 and 9 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. An engine system, comprising:
an engine;
a turbocharger coupled to the engine, the turbocharger including adjustable turbine vanes; and
a controller including non-transient instructions to adjust a turbine vane position in response to an automatic engine stop request generated without an operator directly requesting an engine stop, the turbine vane position adjusted to increase an engine exhaust backpressure.

2. The engine system of claim 1, where the turbine vane position is adjusted to increase the engine exhaust backpressure by less than a threshold amount at a time before a last cylinder to combust an air-fuel mixture prior to engine stop inducts an amount of air participating in combustion after the request to stop the engine.

3. The engine system of claim 1, where the turbine vane position is adjusted at a time after a last cylinder to combust an air-fuel mixture prior to engine stop inducts an amount of air.

4. The engine system of claim 1, further comprising at least partially opening the adjustable turbine vanes after the engine exhaust backpressure is increased.

5. The engine system of claim 4, where at least partially opening the adjustable turbine vanes occurs in response to an operator change of mind condition.

6. The engine system of claim 4, where at least partially opening the adjustable turbine vanes is related to engine stopping time.

7. The engine system of claim 1, further comprising a turbocharger turbine torque adjusting device, and additional instructions to increase a negative torque applied to the turbocharger by the turbocharger turbine torque adjusting device.

8. An engine system, comprising:
an engine;
a turbocharger coupled to the engine, the turbocharger including adjustable turbine vanes; and
a controller including non-transient instructions to adjust a turbine vane position in response to an automatic engine stop request generated without an operator directly requesting an engine stop, the turbine vane position adjusted to increase engine exhaust backpressure during engine stopping, and additional non-transient instructions to increase engine exhaust backpressure during engine starting via adjusting the turbine vane position.

9. The engine system of claim 8, where the turbine vane position is adjusted in response to engine speed during engine starting.

10. The engine system of claim 8, where the turbine vane position is adjusted to increase exhaust backpressure in response to engine speed being greater than a desired engine speed.

11. The engine system of claim 8, further comprising an electrical device that is in electrical communication with a turbocharger turbine shaft.

12. The engine system of claim 11, where the electrical device is a motor, and further comprising additional instructions to increase a negative motor torque in response to the request to stop the engine.

13. The engine system of claim 12, further comprising additional instructions to increase a negative motor torque during engine starting.

14. The engine system of claim 13, further comprising additional instructions to adjust the negative motor torque in response to engine speed.

15. An engine control method, comprising:
adjusting a vane position of a turbocharger to increase engine exhaust backpressure in response to engine stopping and starting requests automatically generated by a controller in response to vehicle conditions other than a dedicated driver input that has a sole purpose of starting and/or stopping the engine; and
adjusting the vane position of the turbocharger to decrease engine exhaust backpressure after adjusting the vane position of the turbocharger to increase engine exhaust backpressure during engine stopping.

16. The engine control method of claim 15, where engine stopping includes engine rotation after the engine stop request.

17. The engine control method of claim 16, further comprising adjusting the vane position in response to engine speed during engine run-up.

18. The engine control method of claim 15, further comprising increasing a negative torque of an electric machine in communication with the turbocharger during engine stopping and engine starting.

19. The engine control method of claim 15, further comprising adjusting the vane position to at least partially open turbocharger turbine vanes during a driver change of mind condition during the engine stopping.

20. The engine control method of claim 15, further comprising adjusting the vane position during the engine starting in response to an engine torque demand during engine run-up.

* * * * *